United States Patent [19]

Mutton et al.

[11] 4,146,293

[45] Mar. 27, 1979

[54] ENTRY DETECTION SCREEN

[75] Inventors: Robert E. Mutton; Dennis E. Riordan, both of Coral Springs, Fla.

[73] Assignee: First Bank of Oakland Park, Oakland Park, Fla.

[21] Appl. No.: 764,930

[22] Filed: Feb. 2, 1977

Related U.S. Application Data

[63] Continuation of Ser. No. 625,529, Oct. 24, 1975, abandoned.

[51] Int. Cl.$^2$ ........................ G01D 21/04; H01R 3/04

[52] U.S. Cl. .................................. 339/147 R; 340/545

[58] Field of Search ................ 339/147; 340/273, 276, 340/541, 545

[56] References Cited

U.S. PATENT DOCUMENTS

| | | | |
|---|---|---|---|
| 3,051,935 | 8/1962 | Willson | 340/273 |
| 3,495,054 | 2/1970 | Lea | 340/276 X |
| 3,863,242 | 1/1975 | Minton | 340/273 |

*Primary Examiner*—Roy Lake
*Assistant Examiner*—E. F. Desmond

[57] ABSTRACT

An entry detection screen, sometimes called a protective screen, is formed having an alarm circuit sewed onto the screen to fix it in place. One form of the circuit includes double wires so that two series circuits can be provided. The double wires can be twisted to make following the circuit more difficult. A twist of the double wires can be made under a frame section where it cannot be seen by an intruder.

8 Claims, 7 Drawing Figures

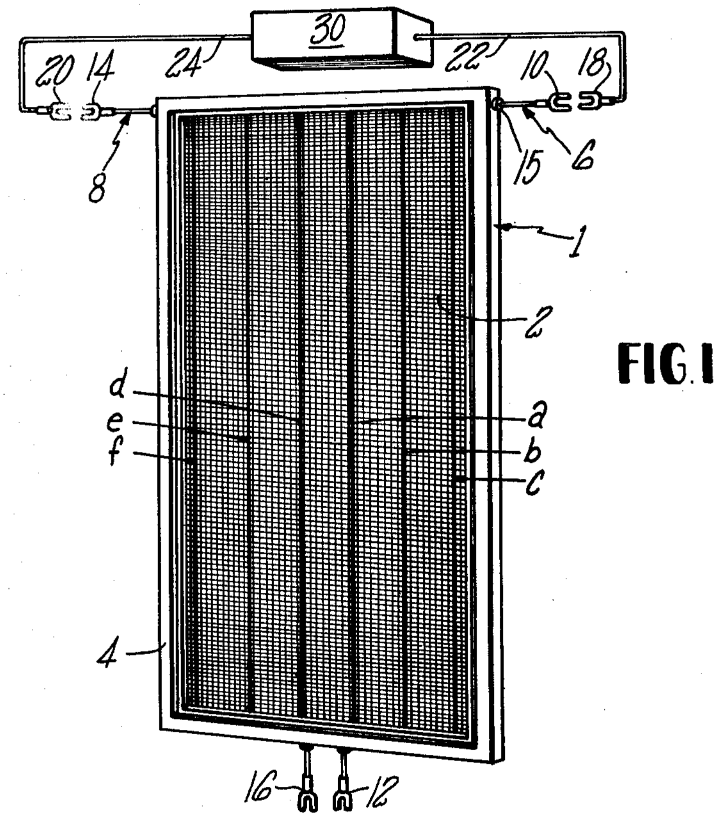
FIG. 1
FIG. 2
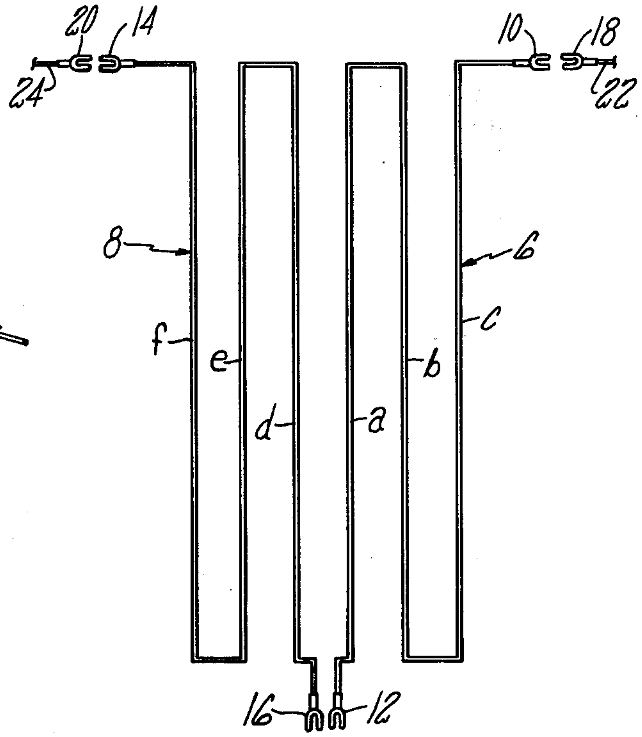
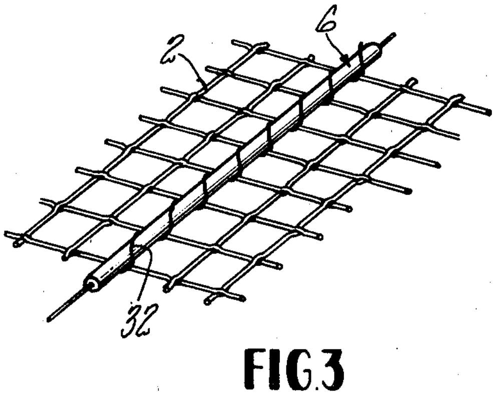
FIG. 3

FIG.4
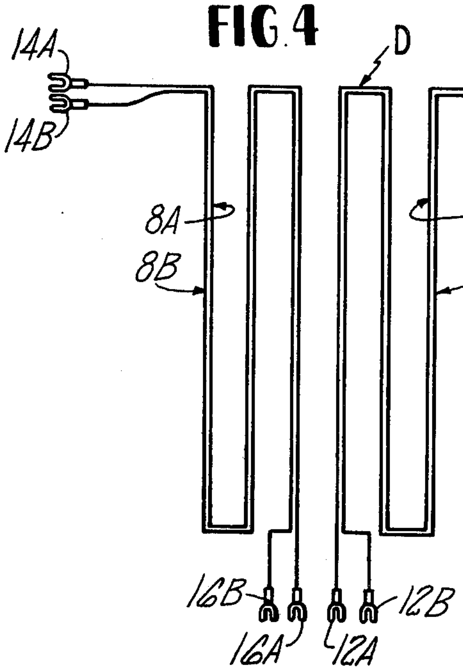
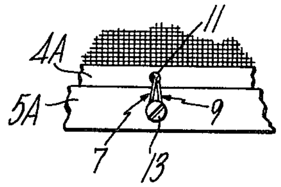
FIG.8
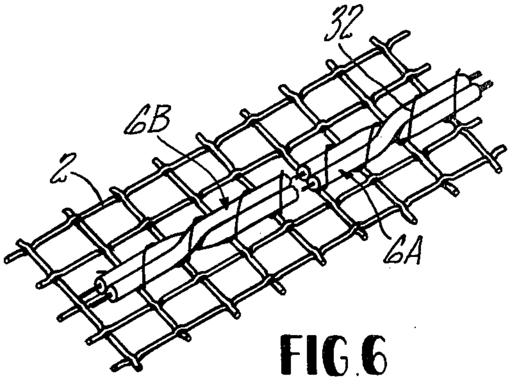
FIG.6
FIG.5
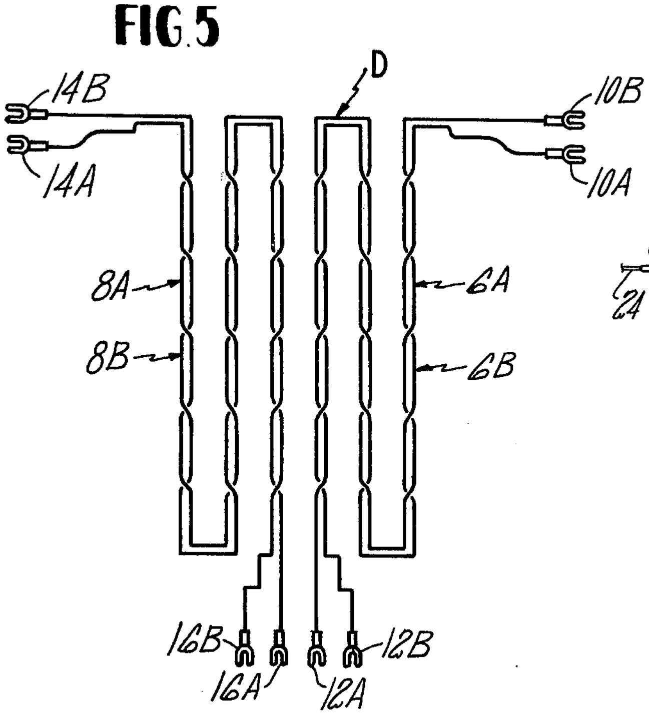
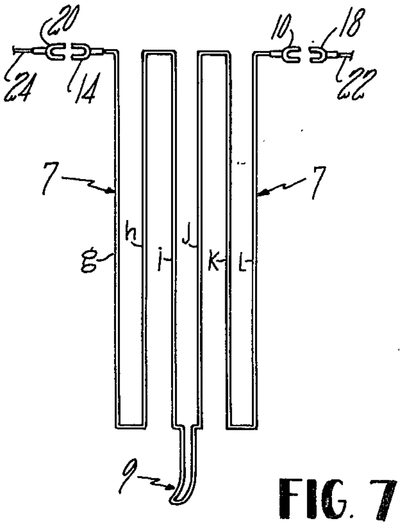
FIG. 7

ENTRY DETECTION SCREEN

This is a continuation, of application Ser. No. 625,529, filed Oct. 24, 1975, now abandoned.

BACKGROUND OF THE INVENTION

This invention relates to alarm devices for indicating attempted entry through a screen, or similar closure, of an opening. The patent to Willson, U.S. Pat. No. 3,051,935, shows a conventional protective screen. Other prior art protective structures have generally been of a complex and expensive construction.

SUMMARY OF THE INVENTION

In accordance with the present invention, the wire means of the protective circuit are sewn onto the screen surface with a chain or loop stitch with the spacing of the stitch being relatively close.

It is an object of this invention to provide ends for a protective circuit at the top corners of a screen frame and at the bottom of the frame, two of said ends being placed one over the other for direct contact so that no electrical conductor is needed between the two ends with any fixing means being used to hold the ends in place on an opening frame, the other ends being connected to an alarm circuit.

It is a further object of this invention to provide a continuous protective circuit on a screen with two free ends and a connected loop extending therefrom, said loop being fixed during installation to an opening frame and said free ends being connected to an alarm circuit.

It is an object of this invention to provide a double circuit alarm system whereby the circuits are placed side by side. The wire means of the circuit can be twisted to make it difficult, if not impossible, for an intruder to accurately trace the circuitry.

It is another object of this invention to provide a double circuitry where the wire means can be twisted underneath the screen frame to make it still more difficult to trace a circuit since the twist cannot be seen.

BRIEF DESCRIPTION OF THE DRAWINGS

FIG. 1 is a perspective view of a protective screen according to the present invention with a network of a single detection circuit fixed thereto and an alarm device;

FIG. 2 is a schematic diagram of the electrical circuit fixed to the screen of FIG. 1;

FIG. 3 is an enlarged view of means fixing the electrical circuit onto the screen;

FIG. 4 is a schematic diagram of the electrical circuit fixed to the screen when a parallel alarm circuit is used;

FIG. 5 is a schematic diagram of the electrical circuit fixed to the screen when the parallel wires are twisted or spiraled;

FIG. 6 is an enlarged view of means fixing the twisted electrical circuit onto the screen;

FIG. 7 is a modified schematic diagram of FIG. 2; and

FIG. 8 is a fragmentary view showing a circuit loop fixed to an opening frame.

DESCRIPTION OF THE PREFERRED EMBODIMENT

Referring to FIG. 1, a screen unit 1 is shown wherein regular screening material 2 is mounted within a frame 4. The frame 4 may be formed of aluminum or other metals, although it may equally well be formed of other rigid materials, such as wood or plastic.

According to a feature of the present invention, the screen 2 has two wire means fixed to a surface of the screen 2 with one wire means 6 forming three protective lengths, a, b and c, extending across one-half of the face of the screen. A second wire means 8 forms three protective lengths, d, e and f, extending across the other one-half of the face of the screen. It is to be understood that wire means refers to any conductive member that can be placed on the surface of the screen and be used for this purpose.

The wire means 6 has a connector 10 on one end and a connector 12 on the other end, while the wire means 8 has a connector 14 on one end and a connector 16 on the other end. The wire means 6 and 8 are insulated from the frame 4 and screening material 2 where it is necessary; for example, (1) where the frame 4 is metallic, the wire means 6 and 8 are coated so as not to make contact therewith; (2) where the screen is metallic, the wire means 6 and 8 are then also provided with a protective coating, so as not to make contact therewith; (3) if the frame 4 is wood and the screening material 2 is a non-conductive material, then bare wire can be used for the wire means 6 and 8. A protective sleeve 15 can be placed in a screen frame 4 where a wire means passes through. This sleeve can project from the frame 4 or end substantially flush therewith, depending on the window frame or opening.

In an installation using the screen units 1, the connectors 12 and 16 are fixed respectively to one end of wire means 6 and 8 with said wire means extending from the frame 4 adjacent each other at the center of the bottom thereof, and the connectors 12 and 16 are placed one over the other, with a screw (not shown) extending through the open portions in the ends thereof to fix the ends to a windown or opening frame (not shown) in which the screen unit is placed to form an electrical connection directly therebetween without having an electrical conductor for bridging the connectors 12 and 16. If the window frame is formed of conductive material, a block of non-conductive material can be placed thereby in which to locate the screw. The connector 10, which is on the other end of the wire means 6 which extends from the upper right-hand corner of the frame 4, is placed over a connector 18 which is on a wire means 22, which is in turn connected to the alarm device 30. A screw (not shown) extends through the open portion of the ends thereof to fix the ends to the window frame (not shown) in which the screen unit is placed to form an electrical connection. Here, as before, if the window frame is formed of conductive material, a block of non-conductive material can be placed thereby in which to locate the screw. The connector 14, which is on the other end of the wire means 8, which extends from the upper left-hand corner of the frame 4, is placed over a connector 20 which is on a wire means 24, which is in turn connected to the alarm device 30.

The alarm device 30 is a conventional one, such as used with the protective screen of Willson, U.S. Pat. No. 3,051,935, and which is basically shown in the patent to Dunne, U.S. Pat. No. 704,246.

The wire means 6 and 8 are fixed to the surface of the screen by being sewed thereto by a chain or loop stitch 32 (see FIG. 3). This stitch passes through the screening material 2 and over the wire means at a relatively close interval with the sewed ends being made difficult to perceive by sight or feel. A spacing of the stitch which would be desirable would be in the range of one-eighth inch to one-quarter inch. This means of fixing the wire means to the screening material 2 while forming an aesthetically pleasing appearance, does not conceal the presence of an alarm system, but makes the removal of the wire means more difficult, making the possibility of cutting the wire means much less than in known methods of affixing wire means. As stated hereinbefore, the deterrance of even an attempt to enter is the best form of protection and a signal, if an entry attempt is made, is the next best form of protection.

As shown in FIG. 4, the screen unit can have double wire means 6A and 6B, and 8A and 8B, providing a positive series circuit and a negative series circuit, fixed on each half of the screening material with two circuits and alarm devices being used. A plurality of circuits is disclosed in U.S. Pat. No. 3,725,891 with their use being in a different manner. The connectors 12A and 12B can be connected respectively to the connectors 16A and 16B in the same manner as the connectors 12 and 16. Likewise, the connectors 10A and 10B, and connectors 14A and 14B, can be connected to other connectors in a positive series circuit and negative series circuit.

As shown in FIG. 5, a screen unit can have a double wire means providing the two circuits and the double wire means can be twisted as shown in FIG. 5 to make it more difficult for an intruder to trace the circuitry in order to gain entry by attempting to jump the wire means to prevent an opening of either circuit. It is noted that where double wire means are used, they can also be crossed at a location such as at D, which is positioned under a portion of the frame 4 and which cannot be seen by an intruder so that the ability to follow the circuitry is again made more difficult.

The double wire means is sewed onto the surface of the screen in the same manner as the single wire means. Care is taken to be sure that the stitch is tight so that it will not permit the stitch to be easily cut and removed. In some installations, a thin coating of epoxy or other hardening agent, can be applied over the stitch and wire means to further reduce the possibility of removal of the wire means from the screening material 2. The spacing of the crossover points of the twisted double wire means can vary, but should be close enough to cause concern to an intruder. Some crossover points could have a double twist to further confuse someone attempting to follow the circuitry.

As shown in FIG. 7, the electrical circuit affixed to the screen 2 is formed as a continuous wire means 7 with six protective lengths g, h, i, j, k and l, extending across the full face of the screen. One free end of the wire means 7 has a connector 10 and the other free end has a connector 14 for connection to an alarm device 30. While having its two free ends and connectors extend from a frame at the top, a section of the wire means 7 extends from the bottom of the frame 4A as a loop 9. This loop 9 can extend from an opening 11 in the frame 4A and can be fixed to an opening frame 5A by any means desired, such as being wound around a screw 13 (see FIG. 8). The fixing means is located on the inside of the screen 2 and frame 4A.

The fixing means can have a sharpened edge so that when a screen 2 and frame 4A is being removed from an opening 5A by an intruder, the loop 9 will be cut, opening the circuit. When a screw 13 is being used, the portion of the screw immediately below the head could have a sharp projection thereon.

We claim:

1. An entry detection screen having a first frame adapted to fit in an opening frame, screen means fixedly mounted in said first frame, individual first and second wire means being fixed to said screen means, each wire means having one end extending through said first frame and terminating externally thereof at the bottom of the first frame, said first wire means having its other end extending through said first frame and terminating adjacent a top corner of the first frame, said second wire means having its other end extending through said first frame and terminating adjacent the other top corner of the first frame, said one end of each wire means having a first connector thereon, said first connectors being adapted to be fixed together and connected to an opening frame into which said first frame fits, said other end of each wire means having a second connector thereon, said second connectors being adapted to be fixed to an alarm circuit and connected to an opening frame into which said first frame fits, said wire means being sewed onto the surface of the screen means, a hardening agent covering the sewed wire means and adjacent screen means.

2. An entry detection screen having a first frame adapted to fit in an opening frame, screen means fixedly mounted in said first frame, individual first and second wire means being fixed to said screen means, each wire means having one end extending through said first frame and terminating externally thereof at the bottom of the first frame, said first wire means having its other end extending through said first frame and terminating adjacent a top corner of the first frame, said second wire means having its other end extending through said first frame and terminating adjacent the other top corner of the first frame, said one end of each wire means having a first connector thereon, said first connectors being adapted to be fixed together and connected to an opening frame into which said first frame fits, said other end of each wire means having a second connector thereon, said second connectors being adapted to be fixed to an alarm circuit and connected to an opening frame into which said first frame fits, said wire means being fixed onto the surface of the screen means, a third and fourth wire means are fixed to said screen means, said third wire means being positioned adjacent said first wire means and said fourth wire means being positioned adjacent said second wire means, each third and fourth wire means being fixed to said screen means and being mounted in the same manner as said first and second wire means.

3. An entry detection screen having a first frame adapted to fit in an opening frame, screen means fixedly mounted in said first frame, individual first and second wire means being fixed to said screen means, each wire means having one end extending through said first frame and terminating externally thereof at the bottom of the first frame, said first wire means having its other end extending through said first frame and terminating adjacent a top corner of the first frame, said second wire means having its other end extending through said first frame and terminating adacent the other top corner of the first frame, said one end of each wire means having a first connector thereon, said first connectors being adapted to be fixed together and connected to an opening frame into which said first frame fits, said other end of each wire means having a second connector thereon, said second connectors being adapted to be fixed to an alarm circuit and connected to an opening frame into which said first frame fits, said wire means being fixed onto the surface of the screen means, a third and fourth wire means are fixed to said screen means, said third wire means being positioned adjacent said first wire means and said fourth wire means being positioned adjacent said second wire means, each third and fourth wire means being fixed to said screen means and being mounted in the same manner as said first and second wire means, said first and third wire means and said second and fourth wire means are twisted at a location under the first frame making it difficult to trace any of the wire means.

4. An entry detection screen having a first frame adapted to fit in an opening frame, screen means fixedly mounted in said first frame, individual first and second wire means being fixed to said screen means, each wire means having one end extending through said first frame and terminating externally thereof at the bottom of the first frame, said first wire means having its other end extending through said first frame and terminating adjacent a top corner of the first frame, said second wire means having its other end extending through said first frame and terminating adjacent the other top corner of the first frame, said one end of each wire means having a first connector thereon, said first connectors being adapted to be fixed together and connected to an opening frame into which said first frame fits, said other end of each wire means having a second connector thereon, said second connectors being adapted to be fixed to an alarm circuit and connected to an opening frame into which said first frame fits, said wire means being fixed onto the surface of the screen means, a third and fourth wire means are fixed to said screen means, said third wire means being positioned adjacent said first wire means and said fourth wire means being positioned adjacent said second wire means, each third and fourth wire means being fixed to said screen means and being mounted in the same manner as said first and second wire means, said first and third wire means and said second and fourth wire means are twisted along the face of the screen.

5. An entry detection screen having a first frame adapted to fit in an opening frame, screen means fixedly mounted in said first frame, individual first and second wire means being fixed to said screen means, each wire means having one end extending through said first frame and terminating externally thereof at the bottom of the first frame, said first wire means having its other end extending through said first frame and terminating adjacent a top corner of the first frame, said second wire means having its other end extending through said first frame and terminating adjacent the other top corner of the first frame, said one end of each wire means having a first connector thereon, said first connectors being adapted to be fixed together and connected to an opening frame into which said first frame fits, said other end of each wire means having a second connector thereon, said second connectors being adapted to be fixed to an alarm circuit and connected to an opening frame into which said first frame fits, said wire means being fixed onto the surface of the screen means, a third and fourth wire means are fixed to said screen means, said third wire means being positioned adjacent said first wire means and said fourth wire means being positioned adjacent said second wire means, each third and fourth wire means being fixed to said screen means and being mounted in the same manner as said first and second wire means, said first and second wire means comprises part of a positive series circuit and said third and fourth wire means comprises part of a negative series circuit.

6. A method of making an entry detection screen device for use in an opening frame including steps of (1) forming a screen frame to fit an opening frame to be protected; (2) selecting a screen to fit said screen frame; (3) placing a protective circuit on said screen; (4) sewing said protective circuit on said screen; (5) fixing said screen in said frame; (6) coating said sewed protective circuit with a liquid hardening substance, and (7) permitting said substance to air harden.

7. A method of making an entry detection screen device for use in an opening frame including steps of (1) forming a screen frame to fit an opening frame to be protected; (2) selecting a screen to fit said screen frame; (3) placing a first protective circuit on said screen; (4) placing a second protective circuit on said screen adjacent said first protective circuit; (5) twisting said first protective circuit and second protective circuit together; (6) sewing said first and second protective circuits on said screen; and (7) fixing said screen in said frame.

8. An entry detection screen having a first frame adapted to fit in an opening frame, screen means fixedly mounted in said first frame, individual first and second wire means being fixed to said screen means, each wire means having one end extending through said first frame and terminating externally thereof at the bottom of the first frame, said first wire means having its other end extending through said first frame and terminating adjacent a top corner of the first frame, said second wire means having its other end extending through said first frame and terminating adjacent the other top corner of the first frame, said one end of each wire means having a first connector thereon, said first connectors being adapted to be fixed together and connected to an opening frame into which said first frame fits, said other end of each wire means having a second connector thereon, said second connectors being adapted to be fixed to an alarm circuit and connected to an opening frame into which said first frame fits, said wire means being mechanically coupled onto the surface of the screen means, said mechanical coupling being formed by a hardening agent between said wire means and said screen means.

* * * * *